United States Patent
Krämer et al.

(10) Patent No.: US 8,573,065 B2
(45) Date of Patent: Nov. 5, 2013

(54) FLUID FLOW MEASURING DEVICE, VALVE DEVICE AND MEASURING METHOD

(75) Inventors: Moritz Krämer, Stuttgart (DE); Hartmut Sauter, Renningen (DE); Holger Christian Schönekess, Rüdershausen Eichsfeld (DE); Hartmut Sohla, Beilstein (DE)

(73) Assignee: Mahle International GmbH (DE)

( * ) Notice: Subject to any disclaimer, the term of this patent is extended or adjusted under 35 U.S.C. 154(b) by 203 days.

(21) Appl. No.: 13/166,086

(22) Filed: Jun. 22, 2011

(65) Prior Publication Data

US 2011/0314930 A1   Dec. 29, 2011

(30) Foreign Application Priority Data

Jun. 23, 2010   (DE) .................. 10 2010 024 690

(51) Int. Cl.
*G01F 1/56* (2006.01)
(52) U.S. Cl.
USPC ...................................... 73/861.08
(58) Field of Classification Search
USPC ............ 73/861.08, 861.71, 861.76, 861.74, 73/861.75
See application file for complete search history.

(56) References Cited

U.S. PATENT DOCUMENTS

| | | | |
|---|---|---|---|
| 3,939,868 A | 2/1976 | Logsdon | |
| 4,620,448 A | 11/1986 | Oblander et al. | |
| 4,729,244 A | 3/1988 | Furuse | |
| 5,635,630 A * | 6/1997 | Dawson et al. | 73/40.5 R |

FOREIGN PATENT DOCUMENTS

| | | |
|---|---|---|
| DE | 3410991 A1 | 10/1985 |
| DE | 3616777 A1 | 11/1987 |
| DE | 4220440 A1 | 1/1993 |
| DE | 29612385 U1 | 9/1996 |
| DE | 102004036084 A1 | 3/2005 |
| DE | 102006003948 A1 | 8/2007 |
| DE | 102007061560 A1 | 6/2009 |
| EP | 1475580 A1 | 11/2004 |
| GB | 2189032 A | 10/1987 |
| GB | 2257789 A | 1/1993 |

OTHER PUBLICATIONS

English abstract for DE-102004036084.
English abstract for EP-1475580.
English abstract for DE-2006003948.
English abstract for DE-102007061560.
English abstract for DE-3616777.

* cited by examiner

*Primary Examiner* — Jewel V Thompson
(74) *Attorney, Agent, or Firm* — Rader, Fishman & Grauer PLLC

(57) ABSTRACT

The present invention relates to a fluid flow measuring device. The device includes a fluid flow having at least one of a volume flow rate and a mass flow rate. At least one spring element is included, which is exposed to the fluid flow, such that the spring element is elastically displaceable in at least one of a ferromagnetic and an electrically conductive mobile region depending on the dynamic pressure acting thereon with an eddy current sensor arranged stationarily. The eddy current sensor generates a measurement signal that is correlated with a distance between the eddy current sensor and the mobile region. The distance varies with the dynamic pressure-related displacement of the mobile region, and at least one temperature sensor is included, the temperature sensor measures an actual temperature of the fluid flow.

20 Claims, 2 Drawing Sheets

FLUID FLOW MEASURING DEVICE, VALVE DEVICE AND MEASURING METHOD

CROSS-REFERENCES TO RELATED APPLICATION

This application claims priority to German patent application DE 10 2010 024 690.5 filed on Jun. 23, 2010, which is hereby incorporated by reference in its entirety.

TECHNICAL FIELD

The present invention relates to a fluid flow measuring device for measuring a volume flow rate and/or mass flow rate of a fluid flow, in particular of an exhaust gas recirculation of an internal combustion engine. The invention further relates to a valve device with at least one valve member for controlling at least one passage opening through which a fluid flow can flow and with such a fluid flow measuring device, in particular in an exhaust gas recirculation of an internal combustion engine. Finally, the invention relates to a method for measuring a volume and/or mass flow rate of a fluid flow, in particular in an exhaust gas recirculation of an internal combustion engine.

BACKGROUND

In many technical fields it is necessary to know a fluid flow, thus in particular a gas flow or liquid flow, with respect to its volume flow rate (volume per time) or with respect to its mass flow rate (mass per time) so as to be able, for example for proper operation of a device working with such a fluid flow, to control or regulate the fluid flow with respect to its volume flow rate or its mass flow rate, or to be able to set parameters of the device which depend on the volume and/or mass flow rate of the fluid flow.

For example, in case of an internal combustion engine equipped with exhaust gas recirculation it is required to know the recirculated exhaust gas quantity, for example to be able to monitor, thus control and/or regulate, an exhaust gas recirculation valve controlling the recirculation quantity. In this case, the fluid flow to be measured is the recirculated exhaust gas flow rate or, respectively, the recirculated exhaust gas flow. The same applies also for example to a fresh air supply of the internal combustion engine.

The present invention is concerned with the problem to provide a way for measuring the fluid flow rate, in particular the exhaust gas flow rate, which is characterized by a fast acquisition of measured values and/or by a compact design.

This problem is solved according to the invention by the subject matters of the independent claims. Advantageous embodiments are subject matter of the dependent claims.

SUMMARY

The invention is based on the general idea to expose a ferromagnetic and/or electrically conductive measuring element to the fluid flow to be measured in such a manner that it is displaced depending on the dynamic pressure of the fluid flow along a defined measuring section, wherein said displacement movement is detected by means of an eddy current sensor. Since the displacement of the measuring element along the measuring section correlates with the dynamic pressure and since, in addition, the dynamic pressure correlates with the volume flow rate and/or mass flow rate of the fluid flow, the signal determined by means of the eddy current sensor together with the knowledge of the total through-flowable cross-section allow a conclusion on the present volume flow rate and/or mass flow rate. The eddy current sensor works very fast so that the determination of the volume flow rate and/or mass flow rate is virtually possible in real-time.

The ferromagnetic and/or electrically conductive measuring element can be formed, for example, by a mobile region of a spring element exposed to the fluid flow, wherein the spring element is with respect to the fluid flow in such a manner that the mobile region of the spring element is spring-elastically displaced depending on the dynamic pressure acting thereon. Compared to the mobile region of the spring element, the respective eddy current sensor is arranged stationarily namely in such a manner that it can generate a measurement signal which correlates with a distance between eddy current sensor and mobile region, wherein said distance varies with the displacement of the mobile region caused by the dynamic pressure. For example, in its ferromagnetic mobile region, the spring element is displaced by the dynamic pressure toward the eddy current sensor or away from the eddy current sensor. By the displacement movement of the ferromagnetic and/or electrically conductive mobile region of the spring element relative to the eddy current sensor, the magnetic flux in the magnetic field of the eddy current sensor is changed. This change is detected by the eddy current sensor via the change of its impedance and, with adequate calibration, can be correlated with the displacement travel covered by the mobile region.

According to an advantageous embodiment, an evaluation device can be provided which associates the distance between mobile region and eddy current sensor with a cross-section through which the fluid flow can pass and which, depending on the measurement signal, generates an output signal which correlates with the volume flow rate and/or with the mass flow rate of the fluid flow. The relationship between measured distance and the through-flowable cross-section can be stored, for example, in the form of a characteristic curve which can be accessed by the evaluation device. Likewise, it is principally possible to store a corresponding algorithm in the evaluation device.

In order to be able to consider thermal effects it is further possible to provide at least one temperature sensor by means of which the temperature of the fluid flow can be measured. By adequately coupling the temperature sensor to the evaluation device, the latter can consider the actual flow temperature when calculating the volume flow rate and/or mass flow rate. The temperature sensor can be used at the same time for thermal compensation of the eddy current sensor. For example, for different temperatures, separate characteristic curves for the correlation between measurement signal and volume flow rate and/or mass flow rate are provided, which curves are stored in a corresponding characteristic diagram which can be accessed by the evaluation device. Likewise, it is possible to consider the flow temperature in a corresponding algorithm.

Additionally or alternatively, an absolute pressure measurement can also be provided since via the dynamic pressure, ultimately, only a differential pressure is determined. Accordingly, it is also possible that at least one pressure sensor is provided by means of which the absolute pressure in the fluid flow can be measured upstream or downstream of the measuring device. The respective pressure sensor is connected in a suitable manner to the evaluation device which then can suitably consider the absolute pressure when determining the volume and/or mass flow rate.

According to an advantageous embodiment, the respective spring element can be a leaf spring which is fastened in a stationary region to the housing and which, in the mobile region, is displaceable relative to the housing, wherein the eddy current is arranged stationarily on said housing. Such a leaf spring is characterized by a particularly simple structure. It is robust and works with high reliability. Alternatively, it is at least in principle possible to configure the respective spring element as helical spring which is fastened at one end to the housing and has the ferromagnetic and/or electrically conductive mobile region at the other end.

Particularly advantageous is a development in which a fluid flow can flow through the housing which has at least one passage opening for this purpose. Advantageously, the entire fluid flow to be measured is guided through the housing or, respectively, through its passage opening(s). The leaf spring is associated with said passage opening in such a manner that the spring leaf changes the through-flowable cross-section depending on the dynamic pressure of the fluid flow. The respective passage opening represents here a predefined geometry. Since, in addition, the leaf spring has a predefined kinematic, the through-flowable cross-section can be determined relatively accurately as a function of the displacement movement of the spring leaf. A corresponding relationship can be stored, for example, in a corresponding algorithm. Likewise, a characteristic curve can be recorded for this purpose. Particularly useful is an arrangement in which the leaf spring is arranged on the outflow side at the respective passage opening so that with increasing dynamic pressure of the fluid flow, the spring leaf increases the through-flowable cross-section of the respective passage opening.

Advantageously, the respective leaf spring can consist of a ferromagnetic sheet metal whereby the spring leaf has a particularly simple structure. Alternatively, a construction is conceivable in which the respective spring leaf itself is not ferromagnetic, consists for example of a particularly fiber-reinforced plastic, and comprises in the mobile region a ferromagnetic and/or electrically conductive element, for example a sheet metal part. Here, the ferromagnetic element can be embedded in the body of the spring element or can be fastened thereto in a suitable manner.

In a particular embodiment, at least one sensor carrier can be provided which is fastened with one side to the housing and carries the respective eddy current sensor at the other end. In this manner, mounting and positioning the respective eddy current sensor can be significantly simplified. It can particularly be provided to equip the sensor carrier for the respective eddy current sensor with a receiving opening which is open toward the leaf spring and in which the eddy current sensor can be inserted. Thus, the sensor carrier itself is not an obstacle for the propagation of the electromagnetic field of the respective eddy current sensor. Particularly useful is a configuration in which the sensor carrier itself is configured as limit stop for the leaf spring and arranged for limiting the displacement movement of the same. It can be required for different uses to limit the displacement travel of the spring element, for example to avoid damage to the spring element. The positioning of the limit stop is to be selected here in such a manner that also the end of the measuring range is reached because then, the measurements detectable by means of the eddy current sensor do not change anymore even in case of a further increasing volume flow rate and/or mass flow rate.

Useful is an embodiment in which the respective leaf spring controls at least two passage openings of the housing through which openings parallel flows can pass. Additionally or alternatively, at least two leaf spring elements configured as leaf springs can be provided which each control at least one passage opening of the housing. Thus, in particular such embodiments in which two leaf springs control in each case two passage openings are also conceivable.

Additionally or alternatively, at least two eddy current sensors which are associated with the same leaf spring can be arranged on the respective sensor carrier. Hereby, for example, differently displaced regions of the spring element can be detected separately so as to improve the measured values.

In a preferred embodiment, the housing can have a cross-section which tapers parallel to the main flow direction of the fluid flow. Hereby, the geometry of the housing facilitates the dynamic pressure formation.

Additionally or alternatively, the housing can comprise at least one wall which is inclined with respect to the main flow direction of the fluid flow and which contains at least one such passage opening. However, advantageously, the housing can have two walls which oppose each other and are each inclined with respect to the main flow direction of the fluid flow and which each contain at least one such passage opening. Moreover, the housing can have two walls which oppose each other and each of which extends largely parallel to the main flow direction of the fluid flow. Overall, the housing is advantageously structured symmetrically, in particular mirror-symmetrically, namely in particular in two symmetry planes arranged perpendicular to each other.

Particularly advantageous is an embodiment in which the respective spring element is formed by a valve member of a valve device, wherein said valve member controls, depending on the dynamic pressure, a through-flowable cross-section of the valve device. In other words, in this embodiment, the fluid flow measuring device is integrated in a valve device in such a manner that the valve member of the valve device forms the spring element of the measuring device. Hereby it is possible to integrate the measuring device in a particularly compact manner into a line conducting the fluid flow if in said line such a valve device is arranged anyway.

In particular, said valve device can involve a check valve which allows a fluid flow in the one direction while it blocks the fluid flow in the opposite direction. For example, the valve device, in particular in the form of a check valve, can be arranged in an external exhaust gas return line of an internal combustion engine.

The respective eddy current sensor can be formed by an electric coil and, accordingly, can comprise a ferritic coil core, a coil winding and electrical connections. During operation, the eddy current sensor can be powered with a constant current so as to generate an electromagnetic field in the rest position. A field change changes the impedance of the eddy current sensor and can be measured accordingly at the connections.

It is particularly useful here if coil core and coil winding are arranged at least on one side facing away from the mobile region of the spring element, e.g. in a non-ferromagnetic barrel housing which can be made of, for example, aluminum or plastic. Hereby, a unit is provided for the eddy current sensor, which unit is simple to handle and thus simple to mount.

As already mentioned above, the spring element can consist of a ferromagnetic and/or electrically conductive material, for example sheet steel, or, alternatively, can have an element consisting of a ferromagnetic and/or electrically conductive material in its mobile region.

Moreover, optionally, at least one temperature sensor can be provided by means of which the actual temperature of the fluid flow can be measured. It can in particular be provided here that the temperature sensor is integrated in the eddy current sensor. For example, it can be provided that the temperature sensor is formed by means of an electric coil or by means of a coil winding. In this case, it can in particular be provided that the eddy current sensor and the temperature sensor are formed by means of the same electrical coil which has two separate coil windings, one of which is associated with the temperature sensor while the other one is associated with the eddy current sensor. Alternatively, the eddy current sensor and the temperature sensor can be formed by means of the same coil winding, wherein the temperature measurement takes place by means of direct current voltage whereas the eddy current measurement takes place by means of alternating current voltage.

Furthermore, optionally, a pressure sensor can be provided by means of which an absolute pressure measurement can be carried out. For this, the pressure sensor can be arranged upstream or downstream of the mobile region. Additionally or alternatively, two pressure sensors can be provided by means of which a differential pressure measurement can be carried out. Here, the one pressure sensor is arranged upstream of the mobile region while the other pressure sensor is arranged downstream of the mobile region.

The present invention further relates to a valve device which has at least one valve member for controlling at least one passage opening through which a fluid flow can flow and which is equipped with a fluid flow measuring device according to the invention. Here, the respective valve member of the valve device forms the respective measuring element or spring element of the fluid flow measuring device. In particular, the valve device can be configured as check valve and/or can be configured for being arranged in an external exhaust gas return line of an internal combustion engine, in particular of a motor vehicle.

Finally, the present invention relates also to a method for measuring a volume flow rate and/or mass flow rate of a fluid flow. In the method according to the invention, at least one ferromagnetic and/or electrically conductive measuring element is exposed in such a manner to a dynamic pressure of the fluid flow that depending on the dynamic pressure, the respective measuring element is displaced spring-elastically, e.g. against a spring force. By means of at least one eddy current sensor it is now possible to detect the displacement movement of the ferromagnetic measuring member and to generate a measurement signal correlated therewith.

Advantageously, the ferromagnetic and/or electrically conductive measuring element can also be formed by a ferromagnetic and/or electrically conductive mobile region of the spring element which allows a dynamic pressure-dependent, spring-elastic displacement of its mobile region.

Particularly advantageous, the volume flow rate and/or mass flow rate of the fluid flow can now be determined from the measurement signal generated by means of the respective eddy current sensor and with consideration of the spring characteristic of the spring element and the geometry of the through-flowable cross-section. Optionally, the actual temperature and/or the actual absolute pressure of the fluid flow and/or the differential pressure over the measuring device can be considered here.

Further important features and advantages of the invention arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the context of the present invention.

BRIEF DESCRIPTION OF THE DRAWING

Preferred exemplary embodiments of the invention are illustrated in the drawings and are explained in the following description in more detail, wherein identical reference numbers refer to identical, or similar, or functionally identical components.

In the figures, schematically.

DETAILED DESCRIPTION

Figure 1:
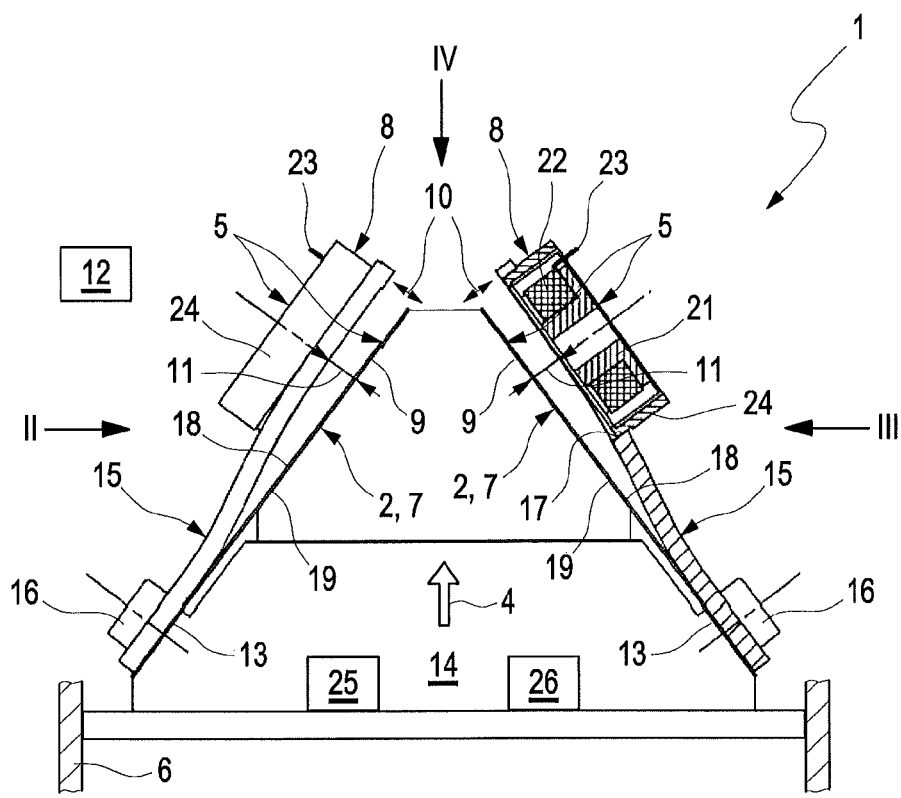
FIG. 1 shows a partial sectional side view of a valve device having a fluid flow measuring device.
Figure 4:
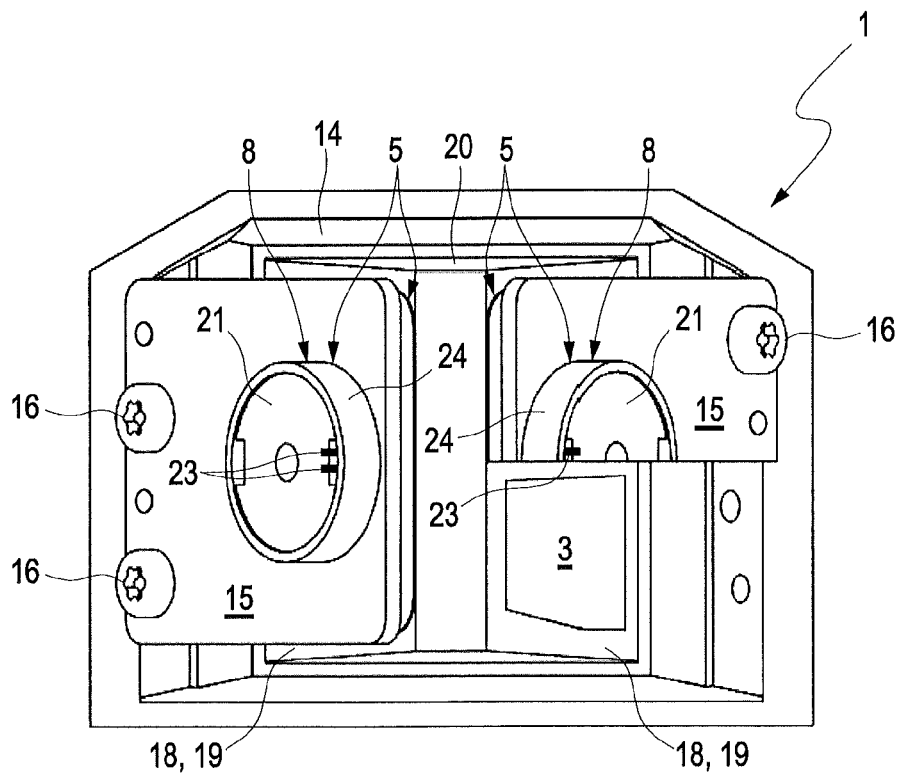
FIG. 4 shows a partial sectional top view of the valve device according to a viewing direction IV in FIG. 1.
Figure 3:
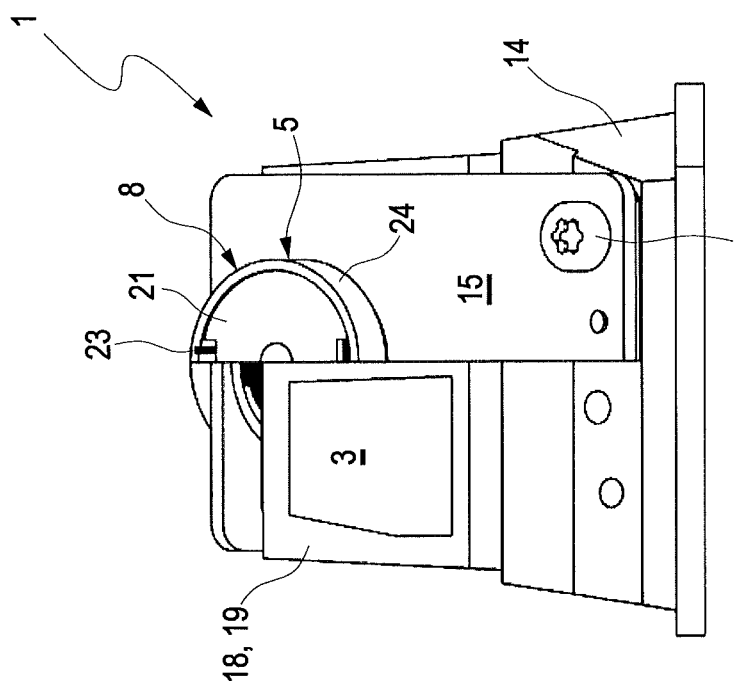
FIG. 3 shows a partial sectional side view of the valve device according to a viewing direction III in FIG. 1.
Figure 2:
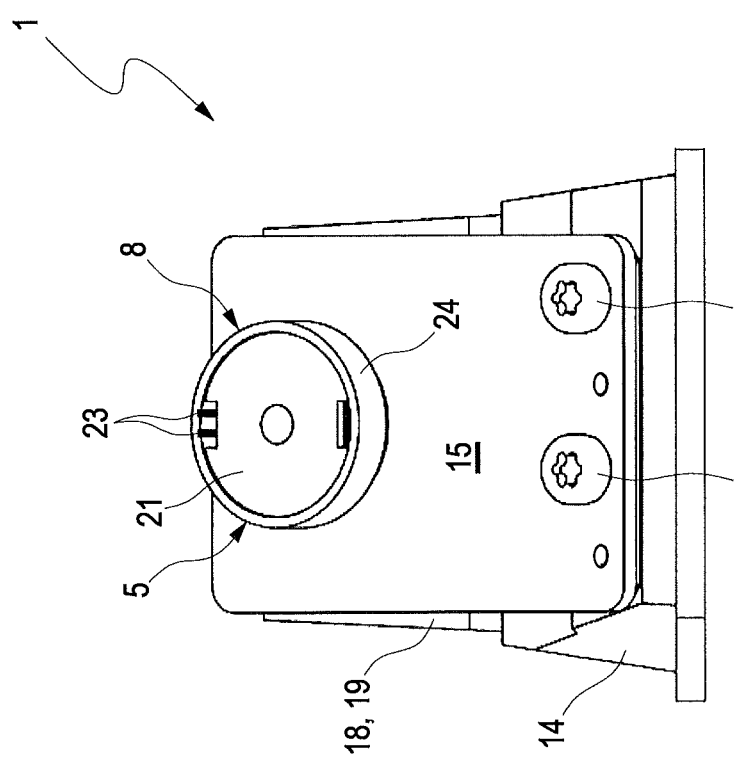
FIG. 2 shows a side view of the valve device according to a viewing direction II in FIG. 1.

According to FIGS. 1-4, the valve device 1 comprises at least one valve member 2 each for controlling at least one passage opening 3 through which a fluid flow 4 indicated by an arrow can flow. Furthermore, the valve device 1 comprises a fluid flow measuring device 5 by means of which the volume flow rate and/or mass flow rate of the fluid flow 4 can be measured. Advantageously, the valve device 1 is configured as check valve which allows the fluid flow 4 in the one direction and blocks it in the opposite direction. Particularly advantageous here is an embodiment in which the valve device 1 is configured for being arranged in an external exhaust gas return line 6 of an internal combustion engine, in particular of a motor vehicle, which is indicated in FIG. 1 in a simplified manner.

In the example shown, the valve device 1 comprises two valve members 2 which each control two passage openings 3. This embodiment is purely exemplary and without limiting the generality.

The fluid flow measuring device 5, hereinafter dedicated as measuring device 5 for short, comprises at least one spring element 7 and at least one eddy current sensor 8. In the shown preferred example, two spring elements 7 and two eddy current sensors 8 are shown. This too is only exemplary and without limiting the generality.

In the shown integration of the measuring device 5 into the valve device 1, the respective spring element 7 is formed by the respective valve member 2. In other words, the respective valve member 2 serves as spring element 7 in the measuring device 5. Conversely, the respective spring element 7 serves as valve member 2 in the valve device 1.

The respective spring element 7 is exposed to the fluid flow 4 namely in such a manner that the spring element 7 is spring-elastically displaceable at least in a mobile region 9 depending on dynamic pressure acting thereon. The displaceability of the mobile region 9 is indicated in FIG. 1 in each case by a double arrow 10.

The spring element 7 is configured at least in its mobile region 9 in a ferromagnetic and/or electrically conductive manner. In comparison to the mobile region 9, the respective eddy current sensor 8 is arranged stationarily in such a manner that it can generate a measurement signal which correlates with a distance 11 which is present between the eddy current sensor 8 and the mobile region 9 and which varies with the dynamic pressure-related displacement of the mobile region 9. In other words, depending on the dynamic pressure of the fluid flow 4, the respective spring element 7 is displaced at least in its mobile region 9 to a greater or lesser extent, whereby the respective distance 11 is changed. This distance change can now be detected by means of the respective eddy current sensor 8.

The measuring device 5 comprises in addition an evaluation device 12 which is coupled in a suitable manner to respective eddy current sensor 8. The evaluation device 12 can now associate the distance 11 between mobile region 9 and eddy current sensor 8 with a cross-section through which the fluid flow 4 can pass and, depending on the measurement signal, can generate an output signal which correlates with the volume flow rate and/or the mass flow rate of the fluid flow.

In the preferred example shown here, the respective spring element 7 involves a leaf spring which hereinafter is also designated by 7. The respective leaf spring 7 is fastened in a stationary region 13 to a housing 14 and, in its respective mobile region 9, can be displaced relative to the housing 14. The respective eddy current sensor 8 is arranged stationarily with respect to the housing 14. The housing 14 can be penetrated by the fluid flow 4 and has at least one passage opening 3 for this purpose. This involves advantageously the respective passage opening 3 of the valve device 1. The leaf spring 7 is now associated with the respective passage opening 3 such that the leaf spring 7 changes the through-flowable cross-section of the respective passage opening 3 depending on the dynamic pressure of the fluid flow 4. In the example, the respective leaf spring 7 is arranged on the outflow side at the respective passage opening 3 so that with increasing dynamic pressure, the respective leaf spring 7 increases the through-flowable cross-section of the housing 14. This corresponds substantially to the valve function of the valve member 2 of the valve device 1. Thus, in the example, the respective leaf spring 7 is associated with at least two passage openings 3 through which parallel flows can pass. Furthermore, two leaf springs 7 are provided here which are each associated with at least one passage opening 3. In the example, two leaf springs 7 are provided which are each associated with two passage openings 3. Advantageously, the respective leaf spring 7 is made of ferromagnetic and/or electrically conductive sheet steel, whereby its mobile region 9 is automatically ferromagnetic and/or electrically conductive.

Here, the valve device 1 is configured as check valve which due to the valve member 2 formed by the leaf spring 7 can also be designated as "reed valve".

On the housing 14, at least one sensor carrier 15 is mounted which each carries at least one eddy current sensor 8. The respective sensor carrier 15, for example, is screwed to the housing 14. A corresponding screw connection is designated by 16. Advantageously, the leaf spring 7 can be integrated in this screw connection 16 so as to brace the respective leaf spring 7 between the housing 14 and the sensor carrier 15.

The respective sensor carrier 15 can have a receiving opening 17 for the respective eddy current sensor 8 which receiving opening is open toward the associated leaf spring 7 and in which the respective eddy current sensor 8 can be inserted. Furthermore, the respective sensor carrier 15 can advantageously be arranged and configured in such a manner that it limits the displacement movement 10 of the spring leaf 7. Hereby, the respective sensor carrier 15 forms a limit stop for the respective leaf spring 7. The limit stop limits an opening movement of the respective spring leaf 7 due to an increasing dynamic pressure. In the opposite direction, an outer side 18 of the housing 14 forms a limit stop for the leaf spring 7 for a closing direction when the dynamic pressure decreases. In particular, the leaf spring 7 abuts against the outer side 18 of the housing 14 so as to close the respective passage opening 3 if the dynamic pressure generated by the fluid flow 4 is too low.

In the embodiment shown here, exactly one eddy current sensor 8 is provided per leaf spring 7. In another embodiment it is also possible that two or more eddy current sensors 8 are provided per leaf spring 7. In this manner, the elastic deformation of the leaf spring 7 during the opening process can be detected more reliably.

The housing 14 can have a tapering cross-section which extends parallel to a main flow direction indicated by the flow arrow 4. Furthermore, the housing 14 can have at least one wall 19 which is inclined with respect to the main flow direction of the fluid flow 4 and which contains the at least one passage opening 3. In the example, two such walls 19 inclined with respect to the main flow direction of the fluid flow 4 are provided, wherein said walls are arranged opposite each other and each of them contains two passage openings. The two inclined walls 19 are connected to each other via two further walls 20 which are arranged opposite each other and extend in each case substantially parallel to the main flow direction of the fluid flow 4 or have at least a significantly smaller inclination with respect to the main flow direction of the fluid flow 4 than the inclined walls 19. Purely exemplary, the inclined walls 19 are inclined here with respect to the main flow direction of the fluid flow 4 by approximately 45°.

The respective eddy current sensor 8 comprises for example a ferritic coil core 21, a coil winding 22 and at least two electrical connections 23. Also provided in the example is a barrel housing 24 which is non-ferritic and consists, for example, of aluminum or plastic. In the barrel housing 24, the coil core 21 and the coil winding 22 are accommodated. In the example shown, the barrel housing 24 is axially open on both sides. However, advantageous is an embodiment in which the barrel housing 24 is closed at least on a side facing away from the respective leaf spring 7. In particular, the barrel housing 24 can be axially closed on both sides so as to achieve a hermetic encapsulation for the eddy current sensor 8.

Regardless of whether the spring element 7 is configured as leaf spring or not, it can consist entirely of a ferromagnetic material, for example sheet steel, which simplifies the implementation of the ferromagnetic and/or electromagnetically conductive mobile region 9. However, principally also conceivable is an embodiment in which the spring element 7 has an element in its mobile region 9, which element consists of a ferromagnetic and/or electrically conductive material. Apart from that, the spring element 7 can be made from a non-ferromagnetic material, for example a plastic, which can in particular be fiber-reinforced.

By means of the measuring device 5 presented here, the volume flow rate and/or mass flow rate of the fluid flow 4 can be determined as follows:

The respective spring element 7 is exposed at least with its ferromagnetic mobile region 9 to the dynamic pressure of the fluid flow 4, namely systematically in such a manner that depending on said dynamic pressure, the respective spring element 7 is spring-elastically displaced at least in its mobile region 9. The respective eddy current sensor 8 can now detect the displacement movement or the position change of the mobile region 9 of the respective spring element 7 and thus can generate a correlated measurement signal. From this measurement signal and with consideration of the spring characteristic of the respective spring element 7 and the geometry of the total through-flowable cross-sections, the evaluation device 12 can now determine the volume flow rate and/or the mass flow rate of the fluid flow 4.

The relationship between the measurement signal of the eddy current sensor 8 and the respective volume flow rate and/or the respective mass flow rate can be determined for example by means of a calibration method in which known volume flow rates and/or mass flow rates are generated and are associated with measurement signals determined by means of the eddy current sensor 8.

For considering the actual fluid temperature, the evaluation device 12 can be coupled with at least one temperature sensor 25 which measures the actual temperature of the fluid flow 4. Additionally or alternatively, the evaluation device 12 can be coupled with at least one pressure sensor 26 which detects the absolute pressure of the fluid flow 4. In the example, the pressure sensor 26 is arranged upstream of the measuring device 5. In principal, it can also be arranged downstream thereof. Advantageously, the respective sensor 25, 26 is arranged on the housing 14.

Likewise, for differential pressure measurement, two such pressure sensors 26 can be provided, namely a first pressure sensor 26 arranged upstream of the measuring device 5 and a second pressure sensor 26 arranged downstream of the measuring device 5. By means of the differential pressure measurement via the measuring device 5, the measuring accuracy for the volume flow rate can be significantly improved. In this case too, the two pressure sensors are advantageously arranged on the housing 14.

Instead of the separate temperature sensor 25 shown here, it can be provided according to another advantageous embodiment to integrate the temperature sensor 25 into one of the eddy current sensors 8. As is well known, the electrical resistance of the coil winding 22 changes proportional to the temperature. Through a measurement of the electrical resistance of the respective coil winding 22, thus, the evaluation device 12 can determine the actual temperature of the fluid. For example, the resistance measurement can be carried out by means of a direct current voltage applied for this purpose to the coil winding 22. In contrast to that, the impedance measurement or the distance measurement takes place by means of an alternating current voltage applied to the coil winding 22. By an adequate voltage combination it is therefore possible to determine the actual temperature as well as the actual distance via the same coil winding. Alternatively, two separate coils can also be provided, namely, on the one hand, a first coil for implementing the temperature measurement and, on the other, a second coil for implementing the distance measurement. Likewise, it is alternatively possible to provide two separate coil windings 22 within the same coil, namely, on the one hand, a first coil winding for implementing the temperature measurement and, on the other, a second coil winding for implementing the distance measurement.

The invention claimed is:

1. A fluid flow measuring device, comprising:
a fluid flow, the fluid flow having at least one of a volume flow rate and a mass flow rate; at least one spring element, the spring element is exposed to the fluid flow, such that the spring element is spring-elastically displaceable at least in at least one of a ferromagnetic and an electrically conductive mobile region depending on the dynamic pressure acting thereon, with an eddy current sensor, which compared to the mobile region of the spring element, is arranged stationarily,
wherein the eddy current sensor generates a measurement signal that is correlated with a distance between the eddy current sensor and the mobile region the distance varies with the dynamic pressure-related displacement of the mobile region; and at least one temperature sensor, the temperature sensor measures an actual temperature of the fluid flow.

2. The measuring device according to claim 1, further comprising, an evaluation device, the evaluation device associates the distance between the mobile region and the eddy current sensor with a cross-section through which the fluid flow flows and, depending on the measurement signal, generates an output signal, the output signal is correlated with at least one of the volume flow rate and the mass flow rate of the fluid flow.

3. The measuring device according to claim 2, wherein the evaluation device is coupled to the at least one temperature sensor and considers the actual temperature of the fluid flow when calculating at least one of the volume flow rate and the mass flow rate.

4. The measuring device according to claim 1, wherein the at least one spring element is a leaf spring, which is fastened to a housing and, which in the mobile region is displaceable relative to the housing, wherein the eddy current sensor is arranged stationarily on the housing, and wherein the at least one leaf spring is at least one of a ferromagnetic and an electrically conductive sheet steel.

5. The measurement device according to claim 4, wherein the fluid flow flows through at least one passage opening configured in the housing, wherein the leaf spring is associated with said passage opening such that depending on the dynamic pressure of the fluid flow, the leaf spring changes a through-flowable cross-section of the at least one passage opening, wherein the leaf spring is arranged on an outflow side of the at least one passage opening such that with increasing dynamic pressure of the fluid flow, said leaf spring increases the through-flowable cross-section of the respective passage opening.

6. The measuring device according to claim 4, further comprising:
at least one sensor carrier, which on a first side, the at least one sensor carrier is fastened to the housing and, on a second side, carries the respective eddy current sensor, wherein the sensor carrier for the respective eddy current sensor has a receiving opening, which is open toward the leaf spring and in which the eddy current sensor is inserted, and wherein the sensor carrier is configured as a limit stop for the leaf spring and is arranged so as to limit the displacement movement of the same.

7. The measuring device according to claim 4, wherein the at least one leaf spring is associated with at least two passage openings configured in the housing through which openings parallel flows pass, wherein at least two spring elements configured as leaf springs are provided, which are each associated with at least one passage opening of the housing wherein on the respective sensor carrier, at least two eddy current sensors are arranged, which are associated with the same leaf spring, wherein the housing has a tapering cross-section, which extends parallel to the main flow direction of the fluid flow, wherein the housing has at least one wall, which is inclined with respect to the main flow direction of the fluid flow and contains at least one such passage opening.

8. The measuring device according to claim 4, wherein the at least one spring element is a valve member of a valve device, which depending on the dynamic pressure, controls a cross-section of the valve device, through which cross-section the fluid flow passes, wherein the valve device is configured as check valve, and wherein the valve device is configured in an external exhaust gas return line of an internal combustion engine.

9. The measuring device according to claim 4, wherein the respective eddy current sensor has at least one ferritic coil core, at least one coil winding and at least one electrical connection, and wherein the coil core and the coil winding are configured on at least one side facing away from the mobile region of the spring element in a non-ferromagnetic barrel housing which is made of at least one of aluminum and plastic.

10. The measuring device according to claim 1, wherein the spring element is at least one of a ferromagnetic and an electrically conductive material, for example sheet steel.

11. The measuring device according to claim 1, wherein the temperature sensor is integrated in the eddy current sensor, wherein the temperature sensor is formed of at least one of an electrical coil and a coil winding, wherein the eddy current sensor and the temperature sensor are formed of the same electrical coil, which has two separate coil windings, one of which is associated with the temperature sensor while the other one is associated with the eddy current sensor, 12. The measuring device according to claim 1, wherein for absolute pressure measurement, one pressure sensor is configured at least one of upstream and downstream of the mobile region, and wherein for differential pressure measurement, two pressure sensors are provided, one of which is arranged upstream and the other one downstream of the mobile region.

13. A fluid flow measuring device comprising:
a valve device having at least one valve member, the valve member is configured to control at least one passage opening through which a fluid flow flows and with a fluid flow measuring device, wherein the at least one valve member forms at least one spring element of the fluid flow measuring device; and
at least one temperature sensor, the temperature sensor measures an actual temperature of the fluid flow.

14. A fluid flow measuring device according to claim 13, wherein the valve device is configured as check valve, and wherein the valve device is configured to be arranged in an external exhaust gas return line of an internal combustion engine.

15. A method for measuring a fluid flow, comprising:
measuring at least one of a volume flow rate and a mass flow rate;
providing at least one spring element;
exposing the spring element in at least one of a ferromagnetic and an electrically conductive mobile region to a dynamic pressure of the fluid flow in such that depending on the dynamic pressure, the respective spring element is elastically displaced at least in the mobile region with at least one eddy current sensor, the displacement movement of the mobile region is detected and a measurement signal correlated therewith is generated;
detecting the temperature of fluid flow with at least one temperature sensor; and generating a measurement signal correlated with the temperature of the fluid flow.

16. The method according to claim 15, further comprising, determining at least one of the volume flow and the mass flow from the measurement signals with consideration of the spring characteristic and the geometry of a through-flowable cross-section, as well as the temperature of the fluid flow.

17. The measuring device according to claim 4, wherein the housing has at least two walls, which oppose each other and are inclined with respect to the main flow direction of the fluid flow and which each contain at least one such passage opening.

18. The measuring device according to claim 4, wherein the housing has two walls, which oppose each other and extend substantially parallel to the main flow direction of the fluid flow.

19. The measuring device according to claim 1, wherein the spring element has an element in the mobile region, which consists of at least one of a ferromagnetic and an electrically conductive material.

20. The measuring device according to claim 1, wherein the eddy current sensor and the temperature sensor are configured with the same coil winding, and wherein a temperature measurement takes place by direct current (DC) voltage whereas the eddy current measurement takes place by alternating current (AC) measurement.

* * * * *